US008893127B2

(12) United States Patent
Guo et al.

(10) Patent No.: US 8,893,127 B2
(45) Date of Patent: Nov. 18, 2014

(54) METHOD AND SYSTEM FOR LOADING APPLICATION TO A LOCAL MEMORY OF A CO-PROCESSOR SYSTEM BY USING POSITION INDEPENDENT LOADER

(75) Inventors: Li Hui Guo, Beijing (CN); Yan Li, Beijing (CN); Haibo Lin, Beijing (CN); Yonghua Lin, Beijing (CN); Yudong Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 12/869,164

(22) Filed: Aug. 26, 2010

(65) Prior Publication Data
US 2011/0055833 A1 Mar. 3, 2011

(30) Foreign Application Priority Data
Aug. 28, 2009 (CN) .......................... 2009 1 0168620

(51) Int. Cl.
*G06F 9/46* (2006.01)
*G06F 9/445* (2006.01)
*G06F 9/38* (2006.01)

(52) U.S. Cl.
CPC .............. *G06F 9/445* (2013.01); *G06F 9/3881* (2013.01)
USPC ...................................................... 718/100

(58) Field of Classification Search
USPC ......................................................... 718/100
See application file for complete search history.

(56) References Cited

U.S. PATENT DOCUMENTS

| 8,010,734 B2* | 8/2011 | Gong ............................ 711/100 |
| 2004/0160446 A1 | 8/2004 | Gosalia et al. |
| 2004/0168078 A1* | 8/2004 | Brodley et al. ............... 713/200 |
| 2009/0031315 A1* | 1/2009 | Inoue et al. ................... 718/102 |
| 2009/0055807 A1 | 2/2009 | Wang et al. |

FOREIGN PATENT DOCUMENTS

| CN | 101373434 A | 2/2009 |
| CN | 101387969 A | 3/2009 |
| EP | 0590645 B1 | 7/2000 |

OTHER PUBLICATIONS

"Position-Independent Code", Oct. 5, 2008, Wikipedia, p. 1.*
Huican Ping,"Process and Process Memory", http://www.hep.wisc.edu/~pinghc/Process_Memory.htm, printed on Mar. 17, 2009.
Chinese Office Action referencing 200910168620.5 dated Feb. 28, 2013, 5 pages.

* cited by examiner

*Primary Examiner* — Thomas Lee
*Assistant Examiner* — Xuxing Chen
(74) *Attorney, Agent, or Firm* — Cantor Colburn LLP (57) ABSTRACT

A co-processor system and a method for loading an application to a local memory of a co-processor system. In the method, re-locatable code and descriptive data are copied from a loading region to a non-loading region. An executable image to be loaded is loaded using the re-locatable code copied to the non-loading region according to the descriptive data. The local memory includes a loading region and a non-loading region, the loading region stories a loader and descriptive data of an executable image to be loaded of the application, and the loader includes re-locatable code. A system is provided for carrying out the steps of the method. In accordance with the system and method of the present invention, flexibility of co-processor system application development is improved without occupying additional storage space.

25 Claims, 7 Drawing Sheets

Fig. 1

Prior Art

METHOD AND SYSTEM FOR LOADING APPLICATION TO A LOCAL MEMORY OF A CO-PROCESSOR SYSTEM BY USING POSITION INDEPENDENT LOADER

CROSS-REFERENCE TO RELATED APPLICATIONS

This application claims priority under 35 U.S.C. §119 from Chinese Patent Application No. 200910168620.5, filed Aug. 28, 2009, the entire contents of which are incorporated herein by reference.

TECHNICAL FIELD OF THE INVENTION

The present invention generally relates to co-processor system, and in particular, to a method for loading an application to the local memory of the co-processor system.

DESCRIPTION OF THE RELATED ART

Figure 1:
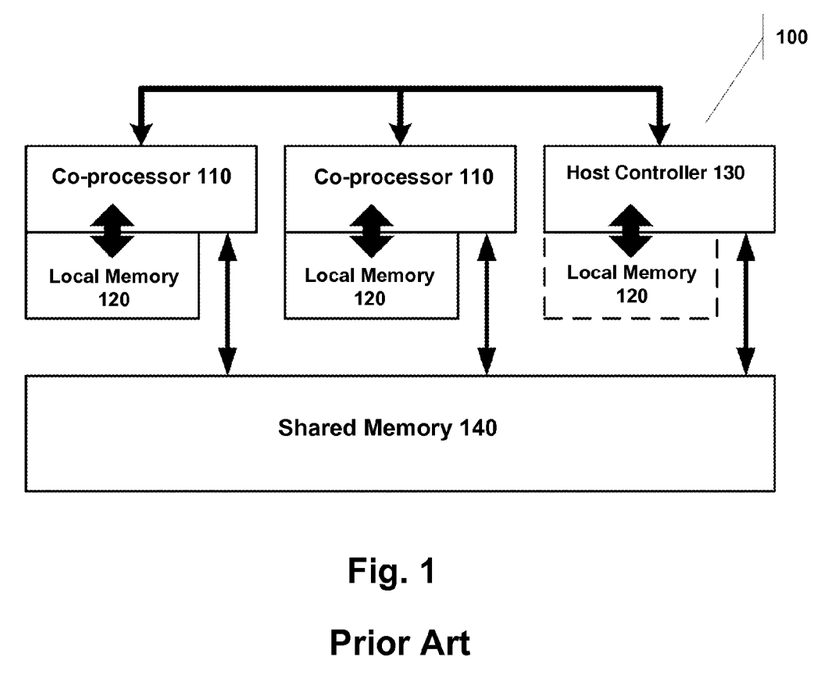
FIG. 1 schematically shows a system structure in which a technical solution according to the present invention may be implemented.

Software managed local memory is typically used in a co-processor based hybrid system structure, for example, Cell/B.E. and some DSP SoCs. FIG. 1 schematically shows a hybrid system structure 100. Each of a plurality of co-processors (also called accelerators) in FIG. 1 has its own local memory 120, and has access to a memory 140 shared with others. The accelerators operate cooperatively under control of a host controller 130, and carry out respective functions by executing codes in their local memories.

Such system structure can optimize performance of an application, but also makes the application development more complex, where code loading is a concern. It is well known that due to various kinds of limitations, a local memory generally has a rather small capacity, being far less than the size of codes and data of a complex application. Typically, codes of an application are divided into a plurality of relatively small stages, and data is divided into relatively small data blocks, such that each stage, together with one or more relevant data blocks, can be loaded into the local memory. In the case of dividing codes into a plurality of stages, a code loader (also called code loading program) is required to join each stage, such that a next stage continues to be executed after a stage is implemented.

There are different code loader designs, for example, host side application loader and processor (or accelerator) side application loader. In a host side application loader, the loader is disposed in a host controller 130, and thus does not take spaces of a local memory of an accelerator. However, this is time consuming since it is required to switch the control between the accelerator and the host controller frequently.

In the accelerator side application loader, the loader is controlled under the accelerator or co-processor 110. Typical accelerator side application loader types include code overlay loader (shortly referred as "overlay loader") and resident application loader (shortly referred as "resident loader"). In an overlay loader, the memory space reserved for an overlay section cannot be used by other functions, and it is necessary to modify the compiling program and linking tool. And this increases the complexity and cost of implementation. In a resident application loader, the resident loaders being linked to a loaded application must be identical and mapped to a same address in the target memory, namely a local memory, thus it is not very flexible.

SUMMARY OF THE INVENTION

Flexibility of code loading in a co-processor system affects patterns and performances of application development. Thereby, the present invention provides an improved application code loading method.

According to an aspect of the present invention, there is provided a method for loading an application to a local memory of a co-processor system. Re-locatable code and descriptive data are copied from a loading region to a non-loading region. An executable image to be loaded is loaded using the re-locatable code copied to the non-loading region according to the descriptive data. The local memory includes a loading region and a non-loading region, the loading region stories a loader and descriptive data of an executable image to be loaded of the application, and the loader includes re-locatable code.

According to another aspect of the present invention, there is provided a co-processor system. The co-processor system includes a co-processor and a local memory of the co-processor. The local memory includes a loader which, in turn, includes re-locatable code. The loader is configured to copy the re-locatable code of the loader and descriptive data of an executable image of an application to a non-loading region of the local memory from a loading region of the local memory. The executable image is loaded by the re-locatable code copied to the non-loading region according to the descriptive data.

By placing the loader in the non-loading region in the local memory which is otherwise not required during loading, the position of the loader is not necessarily subject to a strict restriction. Without occupying additional storage space, the method and system according to the present invention improve flexibility of application development.

BRIEF DESCRIPTION OF THE DRAWINGS

The above and other objectives, features and advantages of the present invention will become more apparent through more detailed description on the preferred embodiments of the present invention as illustrated in the drawings. In the drawings, like or similar reference signs typically indicate like or similar components or parts in the preferred embodiments of the present invention. FIGS. 1 through 5 represent prior art code loading manners. FIGS. 6 through 7 represent code loading manners according to the present invention.

DETAILED DESCRIPTION OF THE PREFERRED EMBODIMENTS

Hereinafter, the preferred embodiments of the present invention will be described in more detail with reference to the accompanying drawings where the preferred embodiments of the present invention are illustrated. However, the present invention may be implemented in various manners and should not be understood as limited by the embodiments depicted herein. Provision of these preferred embodiments is for more thoroughly and comprehensively illustrating the present invention, such that a person of normal skill in the art can understand the essence of the present invention.

The present invention provides a method for loading an application to a local memory of a co-processor system. With respect to the loading of an application, the local memory may be divided into a loading region and a non-loading region. The loading region will be overwritten by code and data corresponding to an executable image being loaded. The non-loading region is typically a storage region which will keep intact when moving code and data of the executable image being loaded, and which will be initialized after the executable image is loaded, or will be used for storing dynamic data during the execution of the loaded application. One example of non-loading area is the runtime stack and heap area.

In order to better understand the present invention, some prior art code loading manners are firstly introduced. Some common concepts and technical implementation details in these manners may be suitable for the specific implementation of the present invention, directly or by slight modification. Thus, description and understanding of these manners may prevent, when describing the present invention and its preferred embodiments, unnecessary description on those technical details which can be implemented according to the prior art.

Figure 2:
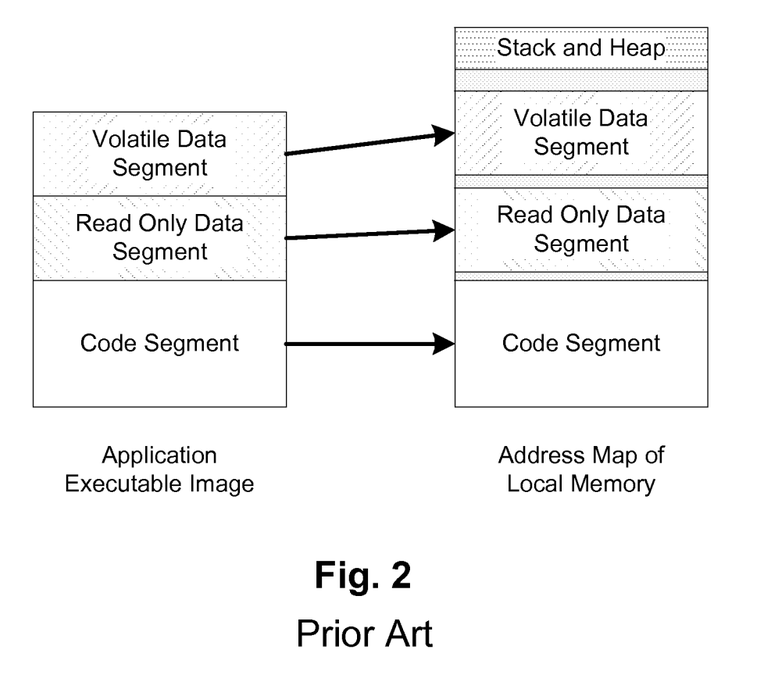
FIG. 2 schematically shows an executable image of an application and address mapping relationships before and after its load.

FIG. 2 schematically shows an executable image of an application and address mapping relationships before and after its load. An executable image of an application (referred to as an "executable image" in the description) is a data structure that includes code and corresponding data of an application or application stages, indicated by a series of segments and address maps (to a person skilled in the art, in the case of a clear context, "stage" is sometimes used to represent corresponding "executable image", and vice versa). The left side of FIG. 2 schematically shows an example of an executable image of an application. As shown, a typical executable image of an application includes: code segments and data segments, and the data segments may be further divided into read-only data segments and volatile data segments; an address map (not shown) specifying addresses of each segment in a target memory space to which the application is to be loaded. The right side of FIG. 2 indicates a layout of a target memory (also called "local memory"). As shown in the right side of FIG. 2 and by the arrows in the figure, when executing the application, the application loader or loading program (hereinafter also called "loader" or "code loader") copies contents in these segments to a memory unit of the target memory according to the address map in the executable image. The loader may set other data segments in a blank storage area, for example, a stack for holding dynamic data structures of an application. However, typically the loader will not change contents in the stack area.

During execution of the application, the contents in the code segments and read-only data segments do not change; the volatile data segments are initialized by the contents in corresponding segments in the executable image, and may change during the execution of the application. The contents in the stack area are only overwritten by the dynamic data structures when the application is running.

Figure 3:
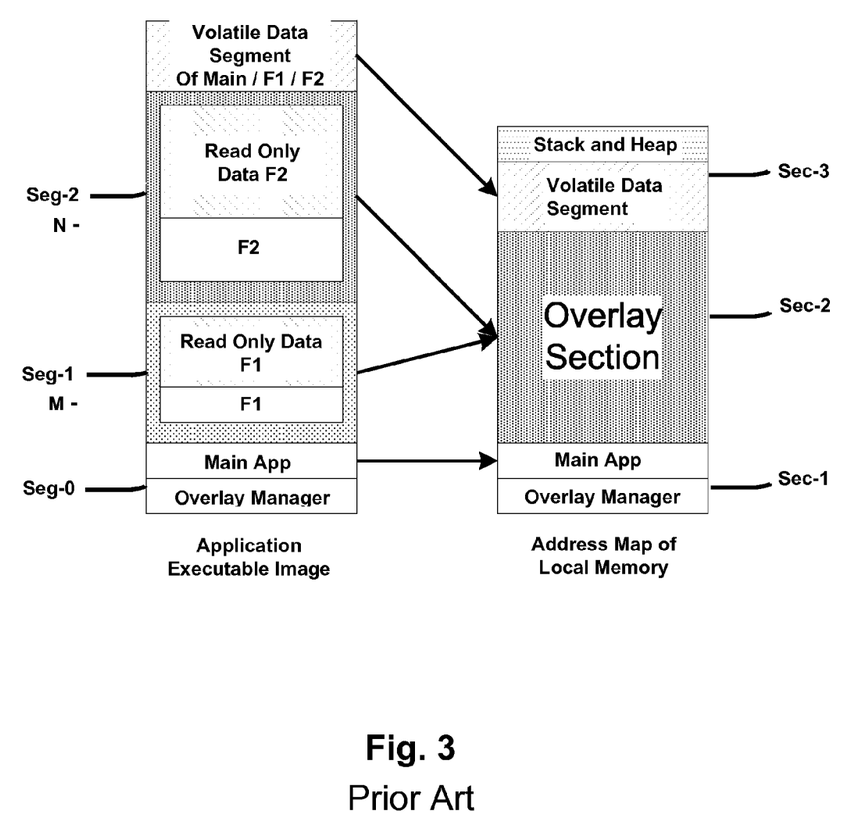
FIG. 3 schematically shows an executable image and a mapping of a local memory.

As described above, an overlay loader is an accelerator side application loader. In an overlay loader, there is an application loader in the local memory that is also called overlay manager OM. FIG. 3 schematically shows an executable image and a mapping of a local memory according to an overlay loader. As shown in the left side of FIG. 3, an application is divided into a primary segment and a plurality of overlay segments (in the figure, only two overlay segments Seg-1 and Seg-2 are indicated schematically). The overlay segments Seg-1 and Seg-2 correspond to two different stages M and N, respectively, which are composed of respective codes and corresponding read-only data. The primary segment is to link different stages (for example M and N) of the application. Shown in the left top portion of FIG. 3 is volatile data of the primary segment and overlay segments Seg-1 and Seg-2.

As shown in the right side of FIG. 3, the local memory at least comprises three sections. The first section, Sec-1, is for storing the primary segment and resident overlay manager OM Seg-0. The second section, Sec-2, is an overlay section, for repetitively placing overlay segments of different stages (M, N) of an application. In other words, Sec-2 places an overlay segment Seg-1 of the stage M at one time, and places an overlay segment Seg-2 of the stage N at another time, where the size of the Sec-2 must be sufficient to hold the largest one among all overlay segments (Seg-1, Seg-2) of the application. The third storage section, Sec-3, is for placing volatile data, which is also resident in the local memory.

As could be appreciated by a person skilled in the art, there may be various kinds of ways to represent mapping between an overlay segment and an overlay section. For example, a link script may be used to map all overlay segments Seg-1 and Seg-2 of an application to an overlay section Sec-2 in the local memory. When initiating an application, the primary segment of the application and the overlay manager OM must initially be loaded to the first storage section Sec-1 in the local memory, and volatile data of the application is also loaded. Then the control is shifted to the primary segment, which calls the overlay manager OM to load the first stage of the application to the overlay section Sec-2, and shifts the control to the first stage. Then the application starts running.

Figure 4:
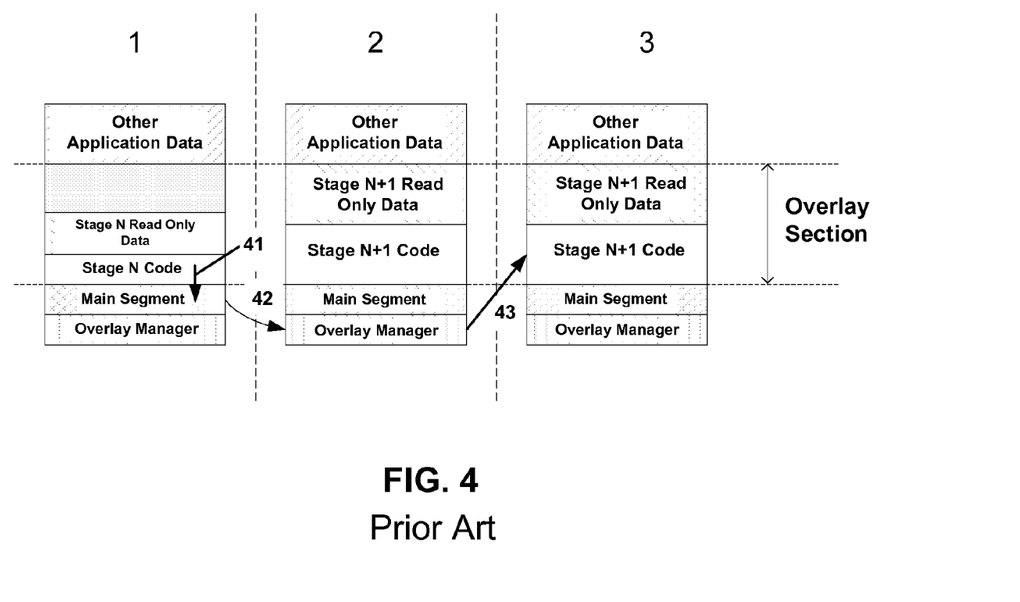
FIG. 4 shows a working pattern of an overlay load.

FIG. 4 schematically shows a working pattern of an overlay loading. In the figure, the procedures of loading the N+1th stage after the Nth stage are shown from left to right. After execution of the Nth stage is completed, the control is shifted to the primary segment (arrow 41). Then, the primary segment calls the overlay manager OM to load the overlay segment corresponding to a next (i.e., the N+1th) stage (arrow 42). After the overlay manager OM completes segment loading, the control is shifted to the overlay segment corresponding to the newly loaded N+1th stage (arrow 43). Then the execution of the N+1th stage starts.

FIG. 4 also shows that in the overlay loader, the size of overlay section must be sufficient to hold the largest segment among all overlay segments of the application, and the storage space reserved for the overlay section shall not be used by other functions, even only a small portion of the storage space is actually occupied by an overlay segment (for example, the overlay segment of Stage N) at a given moment. Moreover, this overlay loading pattern further needs compiling and linking the programs.

Figure 5:
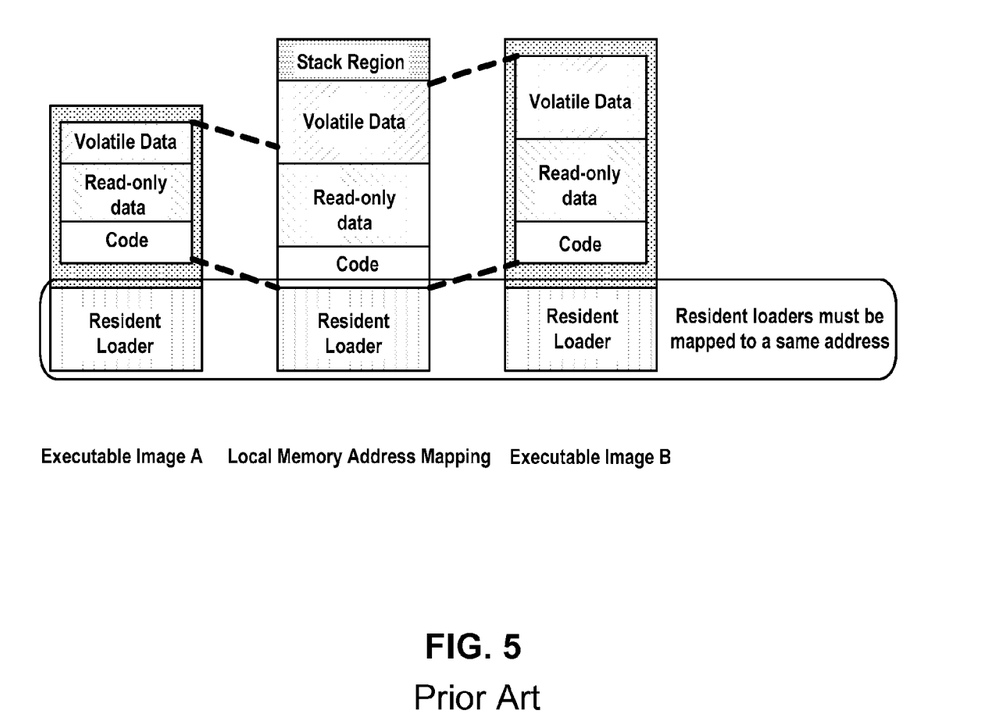
FIG. 5 schematically shows an executable image of a resident loader and an address mapping.

Another kind of accelerator side application loader is a resident application loader or resident loader. FIG. 5 schematically shows an executable image of a resident loader and a memory address mapping. As is known in the art, after being loaded to the local memory of the accelerator for the first time, a resident loader will be resident in the local memory. In FIG. 5, the left side and the right side indicate two different executable images A and B, respectively, while the middle indicates an address mapping of a same local memory. This figure clearly shows that there is a strict limitation condition regarding the use of resident loader, that is, the resident loaders linked to the executable images must be identical and must be mapped to a same address in the local memory, typically located at the start of target memory. When a resident loader loads a new executable image, it loads only the part containing the codes and data of a new application. However, if an application is loaded by a different loader or loaded to a different address, resident loader cannot work, because the resident loader itself will be overwritten by the loaded executable image, such that it cannot implement the load task.

Based on above disclosure, hereinafter, the present invention and its preferred embodiments will be further described in details with reference to FIG. 1 and other figures.

FIG. 1 shows a system structure in which a preferred embodiment according to the present invention may be implemented. When loading codes, as previously mentioned, the local memory 20 in the system structure as shown in FIG. 1 may be divided into a loading region and a non-loading region. The loading region is for placing codes and data corresponding to a loaded executable image; the non-loading region, such as a stack, is a storage region which will be intact when moving codes and data for loading an executable image, and will be initialized after the executable image is loaded or will be used for storing dynamic data when an application is running. The method for loading an application to a local memory of a co-processor according to the present invention makes use of properties of the non-loading region.

Figure 6:
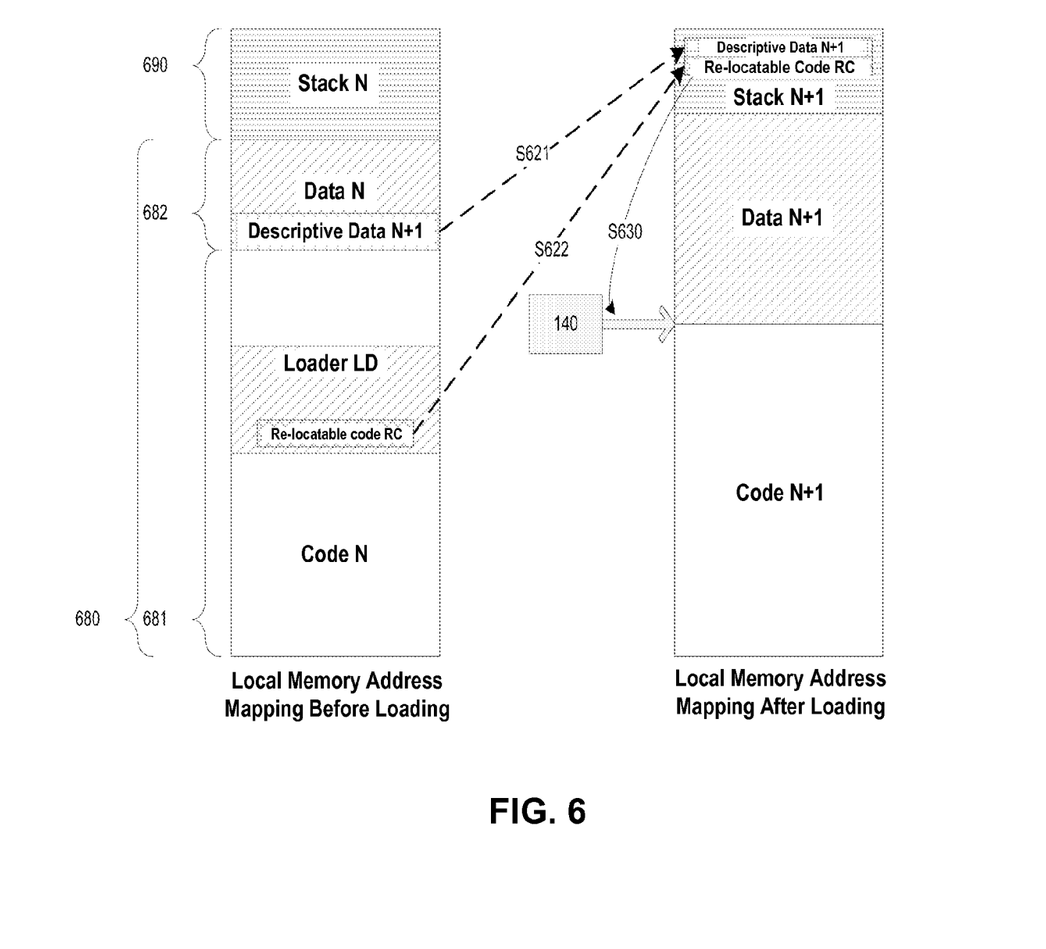
FIG. 6 schematically shows a layout of a local memory during running of a loader according to a preferred embodiment of the present invention.

FIG. 6 schematically shows a layout of a local memory 120 during execution of a loader according to a preferred embodiment of the present invention. What is shown in the left side of FIG. 6 is a layout of the local memory when a stage N of an application is running. In the figure, it is seen that the local memory is divided into two parts, a loading region 680 and a non-loading region 690.

As shown in the left side of FIG. 6, in the loading region 680, in addition to storing the code N of the current stage N, also stored is a loader LD of the present invention and descriptive data N+1 of an executable image or the stage N+1. The loader LD is stored in a code area 681, and the data N of the current stage N as well as descriptive data N+1 of the executable image N+1 are stored in a data area 682. As shown, the loader LD comprises re-locatable code RC. As is known in the art, re-locatable code is a position independent code (PIC), characterized in that its internal addressing model does not depend on storage positions of the code in the memory. Therefore, the re-locatable code is able to be executed even when its storage position in the memory is changed.

According to an embodiment of the present invention, when the executable image N+1 is to be loaded, the loader copies the re-locatable code PC from the current position to the non-loading region 690, indicated by arrow S621, and copies the descriptive data N+1 of the executable image N+1 from the current position to the non-loading region 690, indicated by arrow S622. As a result, the re-locatable code RC and the descriptive data are copied to the non-loading region 690. The descriptive data N+1 includes, for example, the address of the executable image N+1 in a shared memory 140, and positions of the data N+1 and code N+1 of the executable image in the local memory 120. According to the descriptive data, the re-locatable code RC is able to locate the executable image N+1 in the shared memory 140 and load it to a right position in the local memory 120. A person skilled in the art should understand, in practice, the descriptive data of the present invention may be implemented in various ways. For example, the primary segment, as shown in FIG. 3, may be used as a simple implementation of the descriptive data of the present invention.

Next, as indicated by arrow S630, the re-locatable code RC in the non-loading region S630 performs the actual loading of the executable image N+1 according to the descriptive data.

In the right side of FIG. 6, a layout of the local memory 120 after the re-locatable code RC performs actual loading of the executable image N+1 is shown. As shown, now, the code segment and relevant data segment of the next application stage N+1, i.e., code N+1 and data N+1 corresponding to the executable image N+1, are loaded into the code area and data area of the loading region of the local memory 120, respectively.

According to an embodiment of the present invention, the non-loading region 690, in which the descriptive data of the re-locatable code RC and of the executable image N+1 of the loader are stored, may be stack N+1 which is only used when the next stage N+1 is executed, as shown in the right side of FIG. 6. Though the loader in the loading region 680 is gradually overwritten by the code segment of the next stage N+1 during the loading process, since it is the loader re-locatable code RC in the stack N+1 that actually performs the loading of the next stage N+1, and the stack N+1 will not be overwritten during the loading process, thus, the loader re-locatable code RC in the stack N+1 is able to work normally and complete the actual loading task.

As shown in the left side of FIG. 6, the loader region 680 stores the loader LD and the descriptive data N+1 of the executable image N+1, as well as code N and data N. However, it is also possible that the loading region 680 has not yet stored code or data of any application. In this scenario, when initially starting an application, the local memory may be initialized by the loader 110 or the host controller 130, and the loader LD and the descriptive data of an executable image corresponding to the first stage of the application are loaded during the initialization process. At this point, the loader 680 does not store code or data of any stage of the application. After loading the first stage according to the method of the present invention, the loading region 680 starts storing code and data.

As shown in the left side of FIG. 6, if code N and data N are stored in the loading region 680 which further store code N and data N, it means that the application is being executed, i.e., a stage N of the application is currently running.

In this case, the executable image N+1 as indicated by the descriptive data is typically the executable image of the next stage N+1 after the stage N.

However, the executable image N+1 as indicated by the descriptive data may also be an executable image of a stage of another application different from the currently running one. For example, the stage N may be the last stage of the currently running application, and when the stage N is completed, another application will be called. At this point, the executable image N+1 may be a first stage of the other application. It should be noted that since different applications may be independently developed and compiled, different loaders may be used. Therefore, the loader currently located in the loading region 680 may be a different one from the loader for loading the currently running application. During the application loading, different loaders may be used, which is a prominent feature of the present invention.

According to an embodiment of the present invention, if a stage of an application is currently running, then after the execution of the stage is completed, a loader is called to copy the re-locatable code RC and descriptive data from their respective current positions to a non-loading region 690. In practice, it can be done by inserting a call command at the end of the current stage. The details thereof are easily implemented by a person skilled in the art, which need not be detailed.

According to an embodiment of the present invention, as indicated by arrow S630, when the re-locatable code RC in the non-loading region 690 performs the actual loading of the executable image N+1, it also stores the loader linked to the executable image N+1 and the descriptive data of the next executable image into the local memory. The layout of the local memory at this point is similar to the pattern in the left side of FIG. 6.

As known in the art, a loader may be stored in a library file called loading library, and the correspondences between each loader and an application or application stage to be loaded by the loader may be also recorded in the loading library. In this way, the linking relationships between executable images and loaders are established.

According to an embodiment of the present invention, in addition to the re-locatable code RC, a separate code shifter may be configured in the loader, for specifically copying the re-locatable code RC and the descriptive data from their respective current position to the non-loading region.

According to an embodiment of the present invention, in addition to the re-locatable code RC and the code shifter, an application interface API may be configured in the loader, acting as an interface for interacting with an application running in the local memory. Thereby a running stage of the application may call the loader, through the API, to perform the loading task.

Now an actual process of a method for loading an application to a local memory 140 of a co-processor 110 according to the present invention will be described with reference to FIG. 7.

Figure 7:
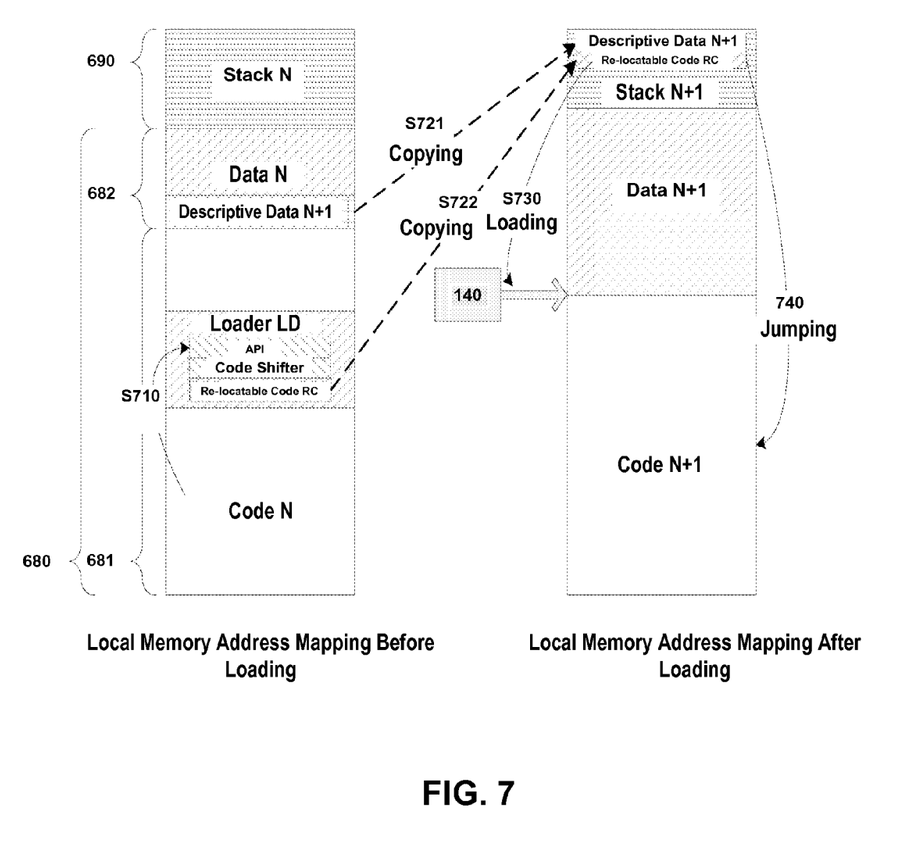
FIG. 7 schematically shows a process of loading an application according to a preferred embodiment of a method of the present invention.

FIG. 7 schematically shows an actual process of loading an application according to a preferred embodiment of a method of the present invention. FIG. 7 differs from FIG. 6 in that the functions of the loader LD are detailed in the left side figure, i.e., the application interface and code shifter as mentioned above are shown; further, some arrows are added to indicate a step of loading process which is closer to reality.

As described above, in the present embodiment, the application interface API is used for calling an application in the local memory so as to load a new application, and the code shifter is used for shifting the actual loader code and descriptive data for describing an executable image to be loaded into the non-loading region 690. In the present embodiment, the re-locatable code in the stack region is used for loading the executable image, wherein the re-locatable code is implemented with a segment of PIC (position independency code), which may be shifted from a storage position to another of the local memory.

Assuming the loading process starts at step S710, where the execution of the currently running application stage N is completed, and the loader LD is then called, i.e., calling the loader LD by calling the application interface API. In calling the loader LD, the application stage N may take the descriptive data N+1 of the executable image of the next stage N+1 in the data area 682 as a parameter.

Next, as indicated by arrow S721 and S722, the API calls the code shifter to copy the re-locatable code RC of the loader and the descriptive data N+1 from their respective current positions in the local memory to the stack region 690.

At step S730, the re-locatable code RC in the stack region performs the actual loading. According to an embodiment of the present invention, the loader re-locatable code RC performs the actual loading as follows: (i) the code N+1 of the next executable image or stage N+1 is loaded into the code area 681 of the local memory according to the descriptive data in the stack region; (ii) the data N+1 of the next executable image N+1 is loaded into the data area 682 of the local memory, according to the descriptive data in the stack region; (iii) volatile data (not shown) of the next executable image N+1 is initialized.

At step 740, after the re-locatable code RC performs the actual loading, there is a jump to an entry of code N+1 of the next stage. Then, the code N+1 will be executed by the co-processor 110 corresponding to the local memory 140, until the application completes its functions, or, as described above, a next stage to be executed continues to be loaded.

According to the same idea as the method of the present invention as described above, the present invention further provides a co-processor system. This co-processor system includes one or more co-processors 110 and a corresponding local memory 120. According to the present invention, the co-processor system is further provided with a relocation loader, i.e., a loader LD comprising re-locatable code RC for actual loading. The loader is configured to copy the re-locatable code of the loader and the descriptive data of the application executable image from a loading region 680 of the local memory to a non-loading region of the local memory, where the executable image is loaded by the re-locatable code copied to the non-loading region 690 according to the descriptive data.

A person skilled in the art should understand, based on the depiction in the description, functionalities for implementing various kinds of preferred embodiments according to the method of the present invention may be configured to the co-processor system according to the present invention, details of which will not be repeated here.

While the present invention and its exemplary embodiments have been described above with reference to the drawings, it should be understood that the present invention is not stringently limited to these embodiments, and a person with normal skill in the art can carry out various kinds of various and modifications to the embodiments without going beyond the scope of the present invention.

A person skilled in the art would appreciate that the present invention may be embodied as an apparatus, a method, or a computer program product. Therefore, the present invention may be specifically implemented in the following manners: complete hardware, complete software (including firmware, resident software, and microcode, etc.). Further, the present invention may also adopt a form of computer program product as embodied in any tangible medium of expression, the medium comprising computer-available program code.

Any combination of one or more computer-available or computer-readable mediums may be used. More specific examples (non-exhaustive list) of the computer-readable medium comprise, but not limited to, the following: an electric connection having one or more leads, a portable computer magnetic disk, hard disk, random access memory (RAM), read-only memory (ROM), erasable programmable read-only memory (EPROM or flash disk), optical fiber, portable compact disk read-only memory (CD-ROM), optical storage device, an internet or intranet transmission medium, or a magnetic storage device. It should be noted that the computer-available or computer readable medium may even be a paper or other suitable medium printed with a program thereon, because the program may be obtained electronically by electrically scanning such paper or other medium, and then compiled, interpreted or processed in a suitable manner, and if necessary, stored in a computer memory.

The computer program code for executing operations of the present invention may be complied by any combination of one or more program design languages, the program design languages including object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example using an internet service provider via Internet).

Besides, the flow of the present invention may be implemented by computer program instructions. These computer program instructions may be provided to a general computer, a dedicated computer or other programmable data processing apparatus, to thereby generating a machine such that these instructions are executed through the computer or other programmable data processing apparatus generate means for implementing functions/operations in a flow of a preferred embodiment of the present invention.

These computer program instructions may also be stored in a computer-readable medium capable of instructing the computer or other programmable data processing apparatus to work in a particular manner, such that the instructions stored in the computer-readable medium generate a product including instruction means for implementing the functions/operations in a flow of a preferred embodiment of the present invention.

The computer program instructions may also be loaded to a computer or other programmable data processing apparatus, such that a series of operation steps are implemented on the computer or other programmable data processing apparatus, to generate a computer-implemented process, such that execution of the instructions on the computer or other programmable apparatus provides a process of implementing the functions/operations prescribed in a flow of a preferred embodiment of the present invention.

What is claimed is:

1. A method for loading an application to a local memory of a co-processor system, the method comprising:
accessing a local memory of a co-processor system, wherein the local memory comprises a loading region and a non-loading region, wherein the loading region stores a loader and descriptive data of an executable image to be loaded of an application, and wherein the loader comprises re-locatable code;
copying the re-locatable code of the loader and the descriptive data from the loading region of the local memory to a stack of the non-loading region of the local memory; and
loading, by use of the re-locatable code of the loader copied to the stack of the non-loading region, the executable image to be loaded according to the descriptive data;
wherein, when the executable image is loaded, the loading region is overwritten by data corresponding to the executable image being loaded; and
wherein the non-loading region is a storage region comprising the stack, and the stack is not overwritten when the executable image is being loaded.

2. The method according to claim 1, wherein the loading region further stores an application stage and the executable image to be loaded corresponds to a next stage following the application stage.

3. The method according to claim 1, wherein the loading region further stores an application stage and the executable image to be loaded corresponds to a stage of another application different from the application to which the application stage belongs.

4. The method according to claim 1, further comprising:
loading, to the local memory, descriptive data of a next executable image to be loaded and a loader associated with the next executable image to be loaded.

5. The method according to claim 2, wherein the application stage calls the loader to copy the re-locatable code and the descriptive data from the loading region to the non-loading region.

6. The method according to claim 5, wherein the loader comprises an application interface, and wherein the application stage calls the loader via the application interface.

7. The method according to claim 6, wherein the loader comprises a code shifter, and wherein the application stage calling the loader to copy the re-locatable code and the descriptive data from the loading region to the non-loading region comprises copying by the code shifter the re-locatable code and the descriptive data from the loading region to the non-loading region.

8. The method according to claim 3, wherein the application stage calls the loader to copy the re-locatable code and the descriptive data from the loading region to the non-loading region.

9. The method according to claim 8, wherein the loader comprises an application interface, and wherein the application stage calls the loader via the application interface.

10. The method according to claim 9, wherein the loader comprises a code shifter, and wherein the application stage calling the loader to copy the re-locatable code and the descriptive data from the loading region to the non-loading region comprises copying by the code shifter the re-locatable code and the descriptive data from the loading region to the non-loading region.

11. The method according to claim 1, wherein the loading comprises:
copying code and data of the executable image to be loaded to the loading region; and
initializing volatile data in the data copied to the loading region.

12. The method according to claim 11, further comprising:
jumping from the re-locatable code copied to the non-loading region to an entry of the loaded executable image.

13. The method according to claim 1, wherein the re-locatable code is a storage position independent code.

14. The method according to claim 1, wherein the non-loading region is a stack region.

15. A co-processor system, comprising:
a co-processor; and
a local memory of the co-processor;
wherein the local memory comprises a loading region and a non-loading region, wherein the loading region stores a loader and descriptive data of an executable image to be loaded of an application, and wherein the loader comprises re-locatable code;
wherein the loader is configured to copy the re-locatable code of the loader and descriptive data of the executable image of the application to a stack of the non-loading region of the local memory from the loading region of the local memory;

wherein the executable image is loaded by the re-locatable code of the loader copied to the stack of the non-loading region according to the descriptive data;

wherein, when the executable image is loaded, the loading region is overwritten by data corresponding to the executable image being loaded; and wherein the non-loading region is a storage region comprising the stack, and the stack is not overwritten when the executable image is being loaded.

16. The system according to claim 15, wherein the loading region of the local memory stores an application stage and the executable image to be loaded corresponds to a next stage following the application stage.

17. The system according to claim 16, comprising:

means for calling the loader by the application stage to copy the re-locatable code and the descriptive data from the loading region to the non-loading region.

18. The system according to claim 17, wherein the loader further comprises an application interface, and wherein the means for calling the loader by the application stage to copy the re-locatable code and the descriptive data from the loading region to the non-loading region further comprises means for the calling the loader by application stage via the application interface.

19. The system according to claim 18, wherein the loader further comprises:

a code shifter, and the means for calling the loader by the application stage to copy the re-locatable code and the descriptive data from the loading region to the non-loading region comprises means for copying the re-locatable code and the descriptive code by the code shifter from the loading region to the non-loading region.

20. The system according to claim 15, wherein the loading region stores an application stage and the executable image to be loaded corresponds to a stage of another application different from the application to which the application stage belongs.

21. The system according to claim 20, comprising:

means for calling the loader by the application stage to copy the re-locatable code and the descriptive data from the loading region to the non-loading region.

22. The system according to claim 21, wherein the loader further comprises an application interface, and wherein the means for calling the loader by the application stage to copy the re-locatable code and the descriptive data from the loading region to the non-loading region further comprises means for the calling the loader by application stage via the application interface.

23. The system according to claim 22, wherein the loader further comprises a code shifter, and wherein the means for calling the loader by the application stage to copy the re-locatable code and the descriptive data from the loading region to the non-loading region comprises means for copying the re-locatable code and the descriptive code by the code shifter from the loading region to the non-loading region.

24. The system according to claim 15, further comprising:

means for loading to the local memory descriptive data of a next executable image to be loaded and a loader associated with the next executable image to be loaded.

25. The system according to claim 15, wherein the non-loading region is a stack region.

* * * * *